(12) United States Patent
Onomatsu

(10) Patent No.: US 7,489,852 B2
(45) Date of Patent: Feb. 10, 2009

(54) VIDEO REPRODUCING APPARATUS

(75) Inventor: Takehiro Onomatsu, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 777 days.

(21) Appl. No.: 11/166,959

(22) Filed: Jun. 23, 2005

(65) Prior Publication Data

US 2006/0002683 A1    Jan. 5, 2006

(30) Foreign Application Priority Data

Jun. 25, 2004    (JP)    ............... 2004-188431

(51) Int. Cl.
H04N 5/76    (2006.01)
H04N 7/26    (2006.01)
(52) U.S. Cl. .................... 386/68; 386/111
(58) Field of Classification Search .......... 386/1, 386/45–46, 68–70, 111, 121
See application file for complete search history.

(56) References Cited

U.S. PATENT DOCUMENTS 7,116,711 B2 *  10/2006  Suzuki ............... 375/240.01

7,424,205 B2 *   9/2008  Kimura ............... 386/95

FOREIGN PATENT DOCUMENTS

JP    10-257501    9/1998
JP    2000-308016    11/2000

* cited by examiner

*Primary Examiner*—Thai Tran
*Assistant Examiner*—Nigar Chowdhury
(74) *Attorney, Agent, or Firm*—Yokoi & Co., U.S.A., Inc.; Peter Ganjian

(57) ABSTRACT

To obtain a high-quality still picture, the video reproducing apparatus comprises (i) a determining processor which determines whether or not a picture being reproduced as a still picture by a still picture reproducing processor is an intra-coded picture and (ii) a storing processor which stores coded data of a picture when it is determined that the picture being reproduced as a still picture by the still picture reproducing processor is the forward predictive-coded picture and stores difference data between the picture being reproduced and all the pictures referenced by the picture being reproduced as well as coded data of the intra-coded picture referenced by the picture being reproduced when the determining processor determines that the picture being reproduced as a still picture by the still picture reproducing processor is not the intra-coded picture.

11 Claims, 6 Drawing Sheets

VIDEO REPRODUCING APPARATUS

BACKGROUND OF THE INVENTION

1. Field of the Invention

The present invention relates to video reproducing apparatus capable of reproducing video based on compressed video data (for example, MPEG data).

2. Description of the Prior Art

MPEG (Moving Picture Experts Group), which is the international standard of the compression/expansion of color motion pictures, has been rapidly spread and applied to computers, communications, entertainment, etc. Of MPEG, MPEG 1 is employed in storage media such as a CD-ROM and MPEG 2 is employed in storage media such as a DVD and also in digital broadcasting.

Now, referring to FIG. 5, the data arrangement structure (bit stream) of MPEG will be described. As shown in FIG. 5, the data arrangement structure of MPEG is formed in a hierarchy structure. The sequence 1 representing the entirety of one vide program is constituted by GOPs (Group of Picture) 2 each of which is an information block formed on a unit basis of a prescribed number of frames, and the GOP 2 is constituted by a prescribed number of pictures 3. Further, the picture 3 is constituted by plural slices 4 which are blocks formed by dividing the picture 2. The slice 4 is constituted by a plurality of macro blocks (hereinafter called as MBs) 5. The MB 5 is constituted by blocks 6 each formed by 8×8 pixels. The MB 5 is a minimum unit for coding of MPEG, that is, DCT (Discrete Cosine Transform) processing.

As shown in FIG. 6, GOP 2 includes an intra-coded picture (hereinafter called as an I picture) which is video information for intra-frame coding, a forward predictive-coded picture (hereinafter called as a P picture) which is video information for forward prediction coding, and a bidirectionally predictive-coded picture (hereinafter called as a B picture) which is video information for bidirectional prediction coding. As shown in FIG. 6, one GOP 2 is constituted by prescribed numbers of I, P and B pictures which are set in advance. In FIG. 6, as shown by the arrows, an I picture 7a and a P picture 7e are referenced by B pictures 7b, 7c, and 7d. Further, the I picture 7a is referenced by the P picture 7e.

Further, compressed video data (MPEG data) before decoding is saved as coded data of the I picture with regard to the I picture, and as difference data between the P picture and the I picture referenced by the P picture or difference data between the B picture and the P picture. During the decoding, the P and B pictures are produced by using the coded data of the I picture and the difference data.

In the reproduction mode, the respective I, P and B pictures shown in FIG. 6 are sequentially reproduced. In this case, the compression rates of video information of these pictures differ from one another. In the still picture mode, when a picture stops at the B picture having the highest compression rate, the picture quality of this picture is quite degraded.

There is an apparatus for reproducing the pictures of video data, wherein when the reproduction of video is paused in a prescribed manner at a B picture, one of I pictures closest to the B picture is displayed in place of the B picture (see, for example, Japanese Unexamined Patent Publication No. 2000-308016). There is also an apparatus for reproducing pictures of the video data wherein, when the reproduction of video is paused in a prescribed manner, a picture having the best picture quality among the pictures including a stopped picture and nearby pictures is displayed (see, for example, Japanese Unexamined Patent Publication No. 10-257501).

However, according to the video reproducing apparatuses disclosed by Patent Documents 1 and 2, compressed video data is expanded (decoded) by pausing operation and still pictures based on the decoded video data are shown. Therefore, the picture quality of such a picture depends on a decoding function of the video reproducing apparatus. As a result, the picture quality of the still picture might be degraded.

SUMMARY OF THE INVENTION

In view of the above, it is an object of the present invention to provide a video reproducing apparatus capable of obtaining a still picture with good picture quality which is not degraded compared with the original compressed video data.

In order to achieve the above object, the present invention provides a video reproducing apparatus capable of outputting video signals based on video data constituted by a sequence of video information blocks each of which constitutes one unit by a prescribed number of intra-coded pictures each of which is video information for intra-frame coding and a prescribed number of predictive-coded pictures for prediction coding by motion compensation prediction, the video reproducing apparatus comprising: (i) a still picture reproducing processor reproducing one of the pictures as a still picture by motion compensation prediction when the reproduction of video signals is paused in a prescribed manner; (ii) a determining processor determining whether or not the picture being reproduced as a still picture by the still picture reproducing processor is the intra-coded picture; and (iii) a storing processor storing coded data of the picture when the above determining processor determines that the picture being reproduced as a still picture by the above still picture reproducing processor is the intra-coded picture, and storing difference data between the picture and all the pictures referenced by the picture as well as coded data of the intra-coded picture referenced by the picture when the above determining processor determines that the picture being reproduced as a still picture by the above still picture reproducing processor is not the intra-coded picture.

As described above, according to the present invention, the above still picture reproducing processor reproduces one of the pictures as a still picture by motion compensation prediction when the reproduction of video signals is paused in a prescribed manner. Further, the above determining processor determines whether or not the picture being reproduced as a still picture by the above still picture reproducing processor is an intra-coded picture (I picture).

The above storing processor stores coded data of the picture when the above determining processor determines that the picture being reproduced as a still picture by the above still picture reproducing processor is the intra-coded picture and stores difference data between the picture and all the pictures referenced by the picture as well as coded data of the intra-coded picture referenced by the picture when the above determining processor determines that the picture being reproduced as a still picture by the above still picture reproducing processor is not the above intra-coded picture (namely, the picture is a P picture or a B picture). When the picture being reproduced as a still picture is an I picture, coded data (intra-coded data) of the picture is captured as it is from the compressed video data and stored. Therefore, the picture quality is not degraded compared with the original compressed video data. Thus, by expanding the intra-coded data using a high-performance PC (Personal Computer) etc., it becomes possible to obtain a high-quality still picture. On the other hand, when the picture being reproduced as a still picture is a predictive coded picture (a P picture or a B picture), difference data between the predictive-coded picture and a picture to be referenced as well as the coded data of an I picture to be referenced by the predictive coded picture are captured as they are from the compressed video data and stored. Therefore, the picture quality is not degraded compared with the original compressed video data. Thus, by using a PC etc., it becomes possible to obtain a high-quality still picture based on such data.

According to another aspect, the present invention provides a video reproducing apparatus capable of outputting video signals based on video data constituted by a sequence of video information blocks each of which constitutes one unit by a prescribed number of intra-coded pictures each of which is video information for intra-frame coding and a prescribed number of predictive coded pictures for prediction coding by motion compensation prediction, the video reproducing apparatus comprising:

a still picture reproducing processor reproducing one of the pictures as a still picture by motion compensation prediction when the reproduction of video signals is paused in a prescribed manner;

a determining processor determining whether or not the picture being reproduced as a still picture by the still picture reproducing processor is the intra-coded picture; and a storing processor storing coded data of the picture when the determining processor determines that the picture being reproduced as a still picture by the above still picture reproducing processor is the intra-coded picture, and storing, with respect to all the pictures including the above picture belonging to the video information block, difference data between every two related pictures and coded data of the intra-coded picture when the above determining processor determines that the picture being reproduced as a still picture by the still picture reproducing processor is not the intra-coded picture.

According to the present aspect with the above configuration, the still picture reproducing processor reproduces one of the pictures as a still picture by motion compensation prediction when the reproduction of the video signals is paused in a prescribed manner. Further, the above determining processor determines whether or not the picture being reproduced as a still picture by the above still picture reproducing processor is an intra-coded picture (I picture).

Further, the above storing processor stores coded data of the picture when the above determining processor determines that the picture being reproduced as a still picture by the above still picture reproducing processor is the above intra-coded picture and stores, with respect to all the pictures including the picture belonging to the above video information block, difference data between every two related pictures and coded data of the intra-coded picture when the above determining processor determines that the picture being reproduced as a still picture by the still picture reproducing processor is not the intra-coded picture. When the picture being reproduced as a still picture is an I picture, coded data of the picture (intra-coded data) is captured as it is from the compressed video data and stored. Therefore, its picture quality is not degraded compared with the original compressed video data. Thus, by expanding the intra-coded data using a high-performance PC etc., it becomes possible to obtain a high-quality still picture. On the other hand, when the picture being reproduced as a still picture is a predictive coded picture (a P picture or a B picture), difference data and the coded data of the I picture are captured as they are from the compressed video data and stored. Therefore, the picture quality is not degraded compared with the original compressed video data. Thus, by using a high-performance PC etc., it becomes possible to obtain a high-quality still picture based on such data.

According to another aspect, the present invention provides a video reproducing apparatus comprising a sending processor sending coded data saved by the above saving processor or coded data and the difference data saved by the above saving processor to an external memory.

According to the present aspect with the above configuration, it is possible to save data stored by the above storing processor in an external memory such as a SmartMedia and a USB memory.

According to still another aspect of the present invention, the above predictive-coded picture is a forward predictive-coded picture which is video information for forward prediction coding or a bidirectionally predictive-coded picture which is video information for bidirectional prediction coding.

According to the present aspect with the above configuration, it is possible to capture coded data of the P picture or the B picture and difference data corresponding to such a picture from the compressed video data and store them.

DESCRIPTION OF THE PREFERRED EMBODIMENTS

Now, embodiments of the present invention will be described.

Although the embodiments will be explained as to the case where the video reproducing apparatus of the present invention is a television tuner which is capable of outputting video signals based on digital broadcast signals. However, the video reproducing apparatus of the present invention is not limited to this, and it may be a DVD player etc. that can reproduce video images based on a DVD on which MPEG data is saved.

Figure 1:
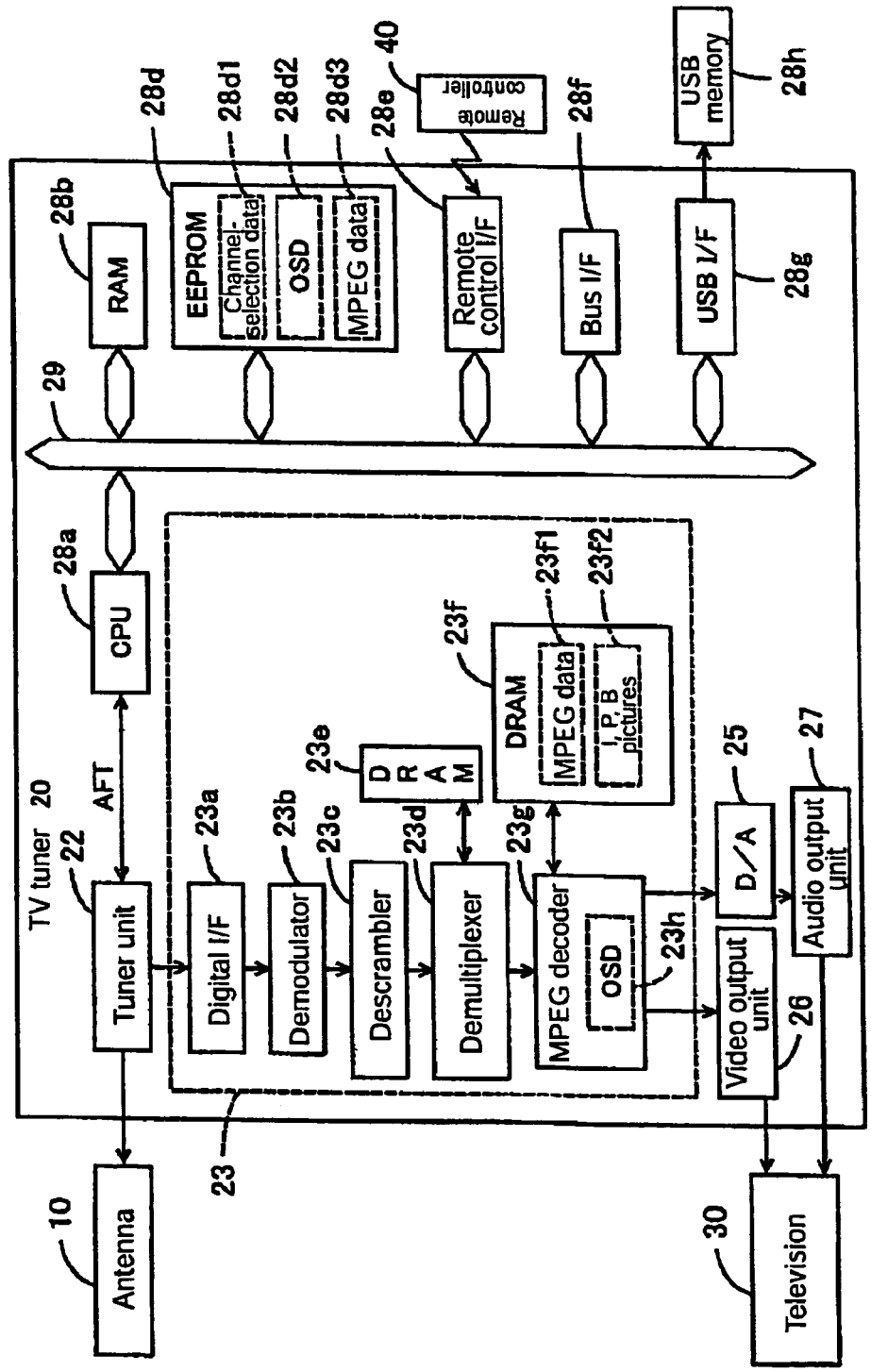
FIG. 1 is a block diagram showing a configuration of a TV-broadcast receiving system.

FIG. 1 is a block diagram of a TV-broadcast receiving system comprising a TV tuner according to the present invention. In FIG. 1, the TV tuner 20 comprises a tuner unit 22 inputting frequency signals from an antenna 10. The tuner unit 22 is of a so-called synthesizer tuner and, as channel-selection control signals, PLL data, namely, data of division ratio of a variable frequency divider in a PLL loop is given to the tuner unit 22. Upon receipt of the PLL data as the channel-selection control signals from a CPU 28*a*, the tuner unit 22 selects one channel from a plurality of channels by extracting a frequency signal of a desired frequency band out of the inputted frequency signals. The CPU 28*a* detects a frequency offset of the tuner unit 22 and, based on the detected result, supplies an AFT voltage to the tuner unit 22. Then, the tuner unit 22 corrects the frequency band to be extracted according to the AFT voltage so that an optimum channel selection can be made.

The output from the tuner unit 22 is supplied to a digital reproduction unit 23. Namely, the TV tuner 20 of the present embodiment is capable of reproducing digital broadcast. The digital reproduction unit 23 comprises a digital I/F 23a, a demodulator 23b, a descrambler 23c, a demultiplexer 23d, and an MPEG decoder 23g. The digital I/F 23a through which frequency signals are inputted from the tuner unit 22 comprises an A/D converter. Further, the demodulator to which signals are supplied from the digital I/F 23a comprises a channel equalizer and an error-correcting decoder, etc.

Namely, the digital I/F 23a and the demodulator 23b convert the frequency signals inputted from the tuner unit 22 into digital signals and perform so-called ghost cancellation on digitally-demodulated signals based on the control information from the CPU 28a. Also, the digital I/F 23a and the demodulator 23b correct bit errors taking place on a transmission line, and obtain transport stream (TS) output. Further, in the above processing, the demodulator 23b detects the ratio of the bit errors to the whole data as a bit error rate.

The transport stream obtained when the demodulator 23b performs demodulation and error correction is supplied to the descrambler 23c. Since the transport stream is usually scrambled, video and audio data cannot properly be reproduced as they are from it. Therefore, the descrambler 23c descrambles the transport stream so that the transport stream is restored to the data arrangement structure that can be reproduced. The transport stream descrambled is in a format where video signals, audio signals, and character information, etc. are multiplexed. Then, such data is supplied to the demultiplexer 23d, and the demultiplexer 23d demultiplexes the inputted data. Namely, the multiplexed data is demultiplexed. Further, it is possible for the descrambler 23c and the demutiplexer 23d to use DRAM 23e as a work area when they perform respective processing.

When the demultiplexing is performed, the data is divided into MPEG data in which video signals and audio signals are compressed by a prescribed method, and data other than the video signals and audio signals such as character information about programs. The latter is supplied to the CPU 28a. On the other hand, the former is supplied to the MPEG decoder 23g and decompressed, namely, MPEG-decoded by the MPEG decoder 23g. Digital video signals and digital audio signals are produced by decoding the MPEG data, and the produced digital video signals are further converted into analog video signals.

The MPEG decoder 23g comprises an OSD processing unit 23h that can display a prescribed still picture overlaid on a video image or replace the prescribed still picture with another and display it. The OSD processing unit 23h is capable of inputting the received data such as character information through the CPU 28a and producing a still picture based on the data such as the character information.

The MPEG decoder 23g performs the MPEG decoding and OSD processing by using the DRAM 23f as an work area. Namely, the MPEG decoder 23g once writes the video data into the external DRAM 23f and performs the processing. In the DRAM 23f, MPEG data 23f1 demultiplexed by the demultiplexer 23d and pictures 23f2 such as an I picture, a P picture, and a B picture produced through the decoding by the MPEG decoder 23g are stored in sequence. When the reproduction of video based on digital broadcasting is paused in a prescribed manner, a still picture based on the picture 23f is reproduced in timing for it. Video signals decompressed and analog-converted by the MPEG decoder 23g are supplied to the video outputting unit 26, which outputs the video signals to the television 30. Various kinds of methods such as composite output and S-Video output can be adopted for outputting analog video signals to the television 30.

On the other hand, the audio signals produced by the MPEG decoding is inputted to a D/A converter 25 and is converted to analog audio signals by the D/A converter 25. These analog audio signals are inputted to an audio outputting unit 27 and are outputted to the television 30 by the audio outputting unit 27. However, if the television 30 is provided with an optical input terminal etc. and can accept digital audio signals, the digital audio signals may be outputted not through the D/A converter 25 but directly to the television 30.

The CPU 28a described earlier is connected to a bus 29 and, using a RAM 28b connected to the bus 29 as a work area, exercises control to achieve various functions of the television tuner 20. A program for exercising control is stored in a ROM 28c in advance, and the CPU 28a exercises control while reading a prescribed program from the ROM 28c into the RAM 28b as required. The bus 29 is provided with a rewritable EEPROM 28d, and the CPU 28a exercises control using various kinds of data saved in the EEPROM 28d.

Channel-selection data 28d1 is saved in the EEPROM 28d. The channel-selection data 28d1 is for the tuner unit 22 to select a frequency band to be received based on a channel-selecting instruction from a remote controller 40 etc. Further, OSD data 28d2 is saved in the EEPROM 28d so that the OSD processing unit can perform OSD processing.

Further, MPEG data 28d3 is saved in the EEPROM 28d. The MPEG data 28d3 is the one retrieved, while the reproduction of video is paused to reproduce a still picture, from the DRAM 23f and stored in the EEPROM 28d according to a prescribed instruction by the remote controller 40 etc., and corresponds to the still picture being reproduced. How the MPEG data is stored will be described later in detail.

The bus 29 is connected with a remote control I/F 28e through which infrared blinking signals outputted from the remote controller 40 as an external device can be inputted. The infrared blinking signals are transmitted through the bus 29 to the CPU 28a, which exercises corresponding control. Further, the bus 29 is connected with a bus I/F 28f for connection to external devices through cables. Further, the bus 29 is connected with a USB I/F 28g, which enables data to be saved in a USB memory 28h as an external memory. The TV tuner 20 of the present embodiment is capable of sending the MPEG data 28d3 stored in the EEPROM 28d to the USB memory 28h based on a prescribed operation by the remote controller 40 etc.

Figure 2:
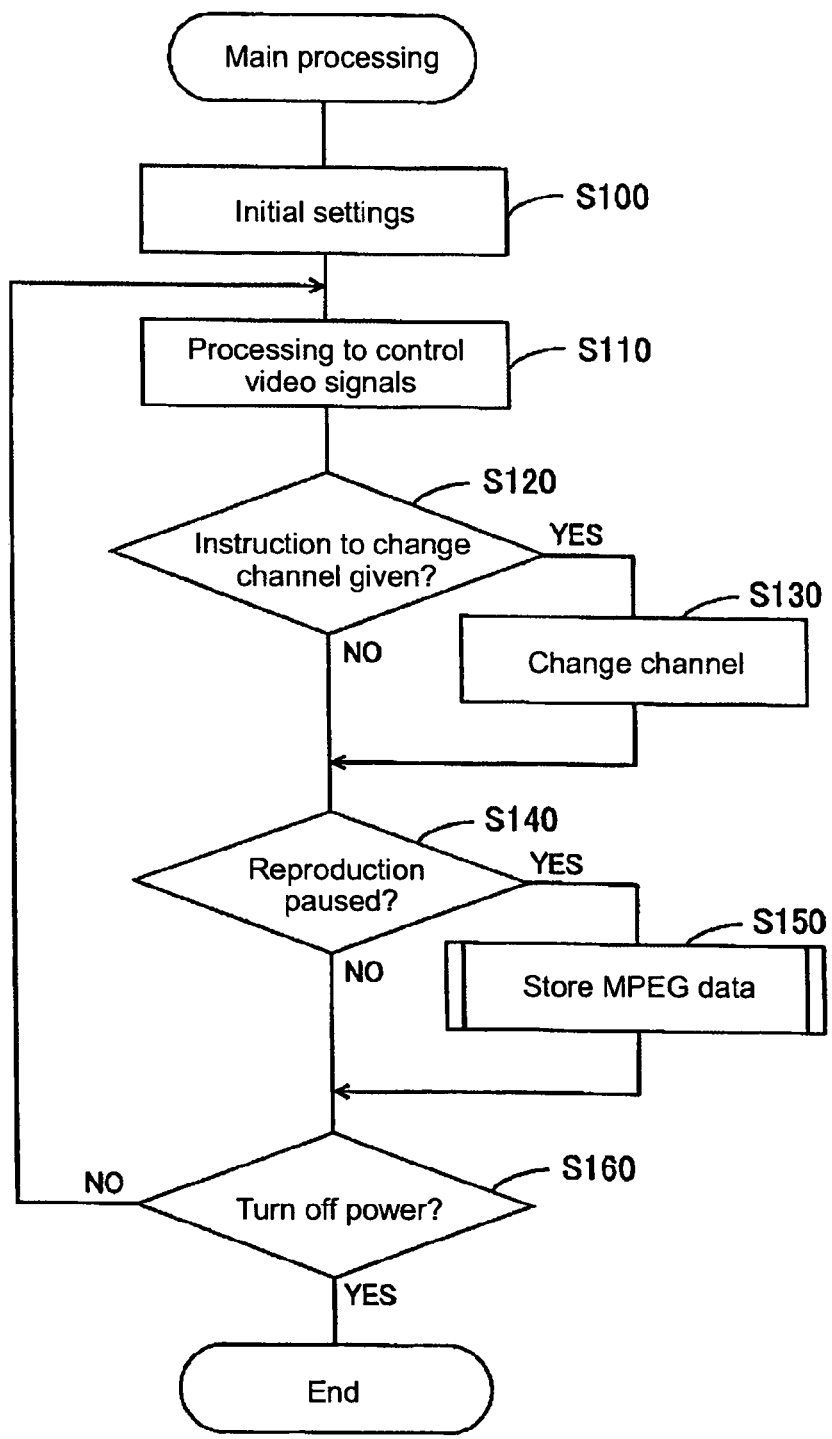
FIG. 2 is a flowchart showing main processing.

Now, referring to the flowchart of FIG. 2, a flow of main processing performed at the TV tuner 20 of FIG. 1 will be described. First, in step S100, initial settings are made. In this step, processing related to the initial settings such as clearing the register of the CPU 28a and the RAM 28b, reading the set data for adjusting white balance from the EEPROM 28d, etc. are performed.

Next, in step S110, processing to control video signals is performed. In this step, based on a current channel number saved in the EEPROM 28d, the CPU 28a controls, under its initiative, units and circuits making up the TV tuner 20 and performs processing for showing a television picture corresponding to the channel number on the television 30.

In step S120, it is checked whether or not an instruction to change the channel is given. Namely, it is checked whether or not an input to change the channel by the remote controller 40 etc. is made. When an instruction to change the channel is given, a frequency band corresponding to the channel instructed is determined in step S130. Then, processing to change the channel is performed by giving PLL data corresponding to the frequency to the tuner unit 22.

When performing processing of step S130 or when it is determined that there has been no instruction to change the channel in step S120, it is checked in step S140 whether or not the reproduction is paused. In this step, it is checked whether or not an input of instruction to pause the reproduction of video based on the digital broadcast signals is given by the remote controller 40 etc. When the reproduction has been paused, the MPEG data is stored in step S150. How the MPEG data is stored will be described in detail by referring to the drawing (FIG. 3) later.

When the processing in step S150 is performed or when it is determined that the reproduction is not paused in step S140, it is checked whether or not an instruction to turn off the TV tuner 20 is given in step S160. When an instruction to turn off the TV tuner 20 has not been given, the process returns to step S110. When such an instruction has been given, the main processing is ended.

Now, referring to FIG. 3, a flow of storing the MPEG data called and executed in step S150 of the flowchart shown in FIG. 2 will be described. First, in step S200, a still picture is reproduced. In this step, a still picture is reproduced in timing for pausing the reproduction of video signals in step S140 of the flowchart shown in FIG. 2.

Next, in step S210, it is checked whether or not an instruction to store the MPEG data is given. In this step, it is checked whether or not an instruction to store MPEG data corresponding to the still picture being reproduced in step S200 is given by the remote controller 40 etc. If an instruction to store the MPEG data has not been given, the processing to store MPEG data is ended.

Figure 6:
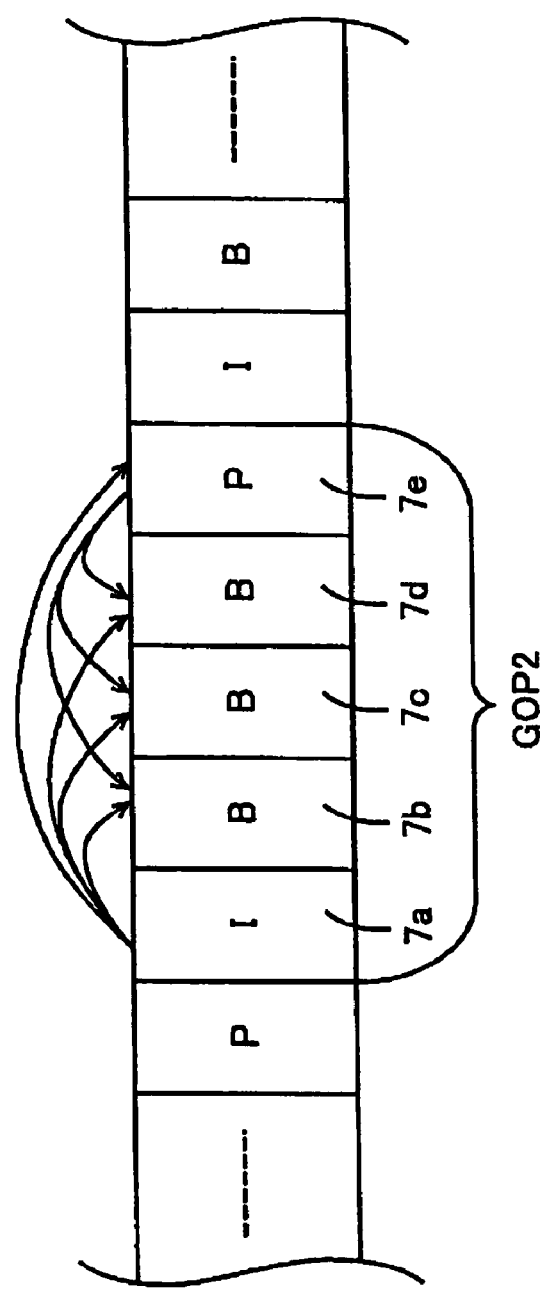
FIG. 6 is a conceptual diagram for showing a configuration of GOP.

On the other hand, in step S210, when it is determined that an instruction to store the MPEG data has been given, it is checked whether or not the reproduction is paused at an I Picture in step S220. Namely, it is checked whether or not the picture being reproduced is the one based on the I picture. If it is determined that the reproduction has paused at the I picture, coded data of the I picture is stored in step S230. In this step, the coded data of the I picture corresponding to the still picture being reproduced is retrieved from the DRAM 23f and stored in the EEPROM 28d. For example, in FIG. 6, when the I picture corresponding to the still picture is an I picture 7a, coded data of the I picture 7a is captured from the MPEG data saved in the DRAM 23f and stored in the EEPROM 28d.

On the other hand, in step S220, when it is determined that the reproduction has not been paused at the I picture (but a P picture or a B picture), processing is performed, in step S240, to retrieve coded data of the I picture referenced by the P picture or the B picture corresponding to the still picture being reproduced and difference data between the picture being reproduced and the I picture or the P picture to be referenced from the DRAM 23f and store them in the EEPROM 28d. For example, in FIG. 6, when the P picture corresponding to the still picture is a P picture 7e, of the MPEG data saved in the DRAM 23f, coded data of the I picture 7a referenced by the P picture 7e and difference data between the picture being reproduced and the I picture 7a or the P picture 7e are captured and stored in the EEPROM 28d. Also, in FIG. 6, when the B picture corresponding to the still picture is a B picture 7c, of the MPEG data saved in the DRAM 23f, coded data of the I picture 7a referenced by the B picture 7c, difference data between the picture being reproduced and the I picture 7a or the B picture 7c, and difference data between the picture being reproduced and the P picture 7e referenced by the B picture 7c or the B picture 7c are captured and stored in the EEPROM 28d.

When the processing of step S230 or step S240 has been performed, it is checked whether or not an instruction to send the MPEG data is given in step S250. In this step, it is checked whether or not an instruction is given to send MPEG data stored in the EEPROM 28d in step S230 or step S240 to the USB memory 28h. If it is determined in step S250 that the instruction to send the MPEG data has been given, the MPEG data stored in the EEPROM 28d is sent to the USB memory 28h in step S260. Also, when it is determined that an instruction to send the MPEG data has not been given, the processing to store MPEG data is ended.

Now, a specific example of the main processing shown in FIG. 2 will be described. First, processing related to initial settings is performed (step S100) and a television picture corresponding to a currently received channel is displayed on the television 30 (step S110). Then, it is checked whether or not an instruction to change the channel while the television picture is shown is given (step S120). If it is determined that such an instruction has been given, the currently chosen channel is changed (step S130). Further, it is checked whether or not the reproduction of video signals is paused while the television picture is shown (step S140). If it is determined that the reproduction has been paused, processing to store MPEG data is performed (step S150).

When storing the MPEG data, first, a still picture is reproduced in timing for pausing the reproduction of video (step S200). Then, it is checked whether or not an instruction to store the MPEG data is given during the reproduction of the still picture (step S210). If it is determined that the instruction has been given, it is checked whether or not the still picture being reproduced is based on an I picture (step S220). If it is determined that the still picture being reproduced is based on the I picture, coded data of the I picture is captured and stored in the EEPROM 28d (step S230). Further, if it is determined that the still picture being reproduced is based on a P picture or a B picture, coded data of the I picture to be referenced and difference data are captured and stored in the EEPROM 28d (step S240). Then, it is checked whether or not an instruction to send the stored MPEG data to the USB memory 28h is given (step S250). If such an instruction has been given, the MPEG data is sent to the USB memory 28h.

Figure 3:
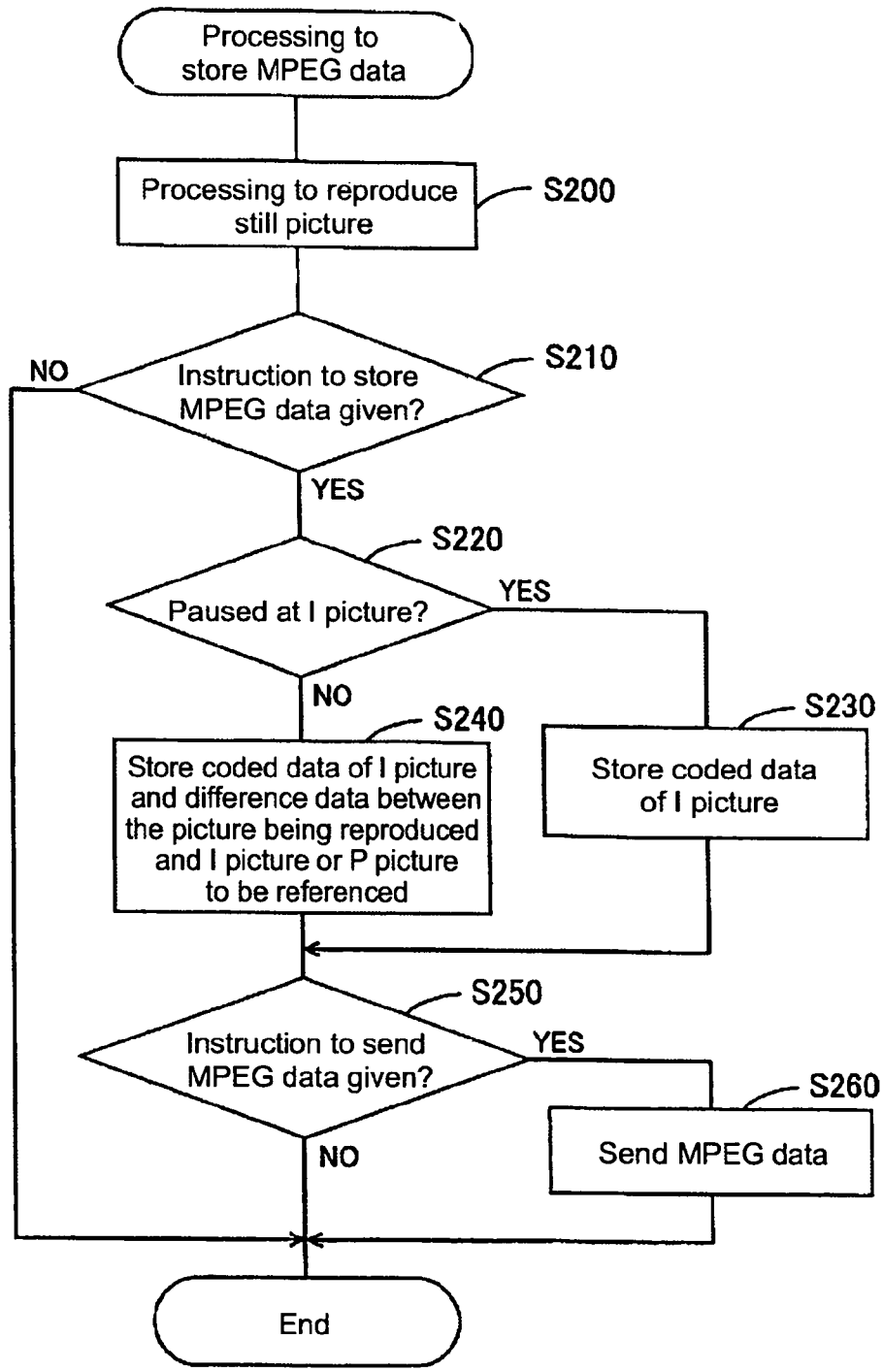
FIG. 3 is a flowchart showing processing to store MPEG data which is called and performed in step S150 of the flowchart shown in FIG. 2.
Figure 4:
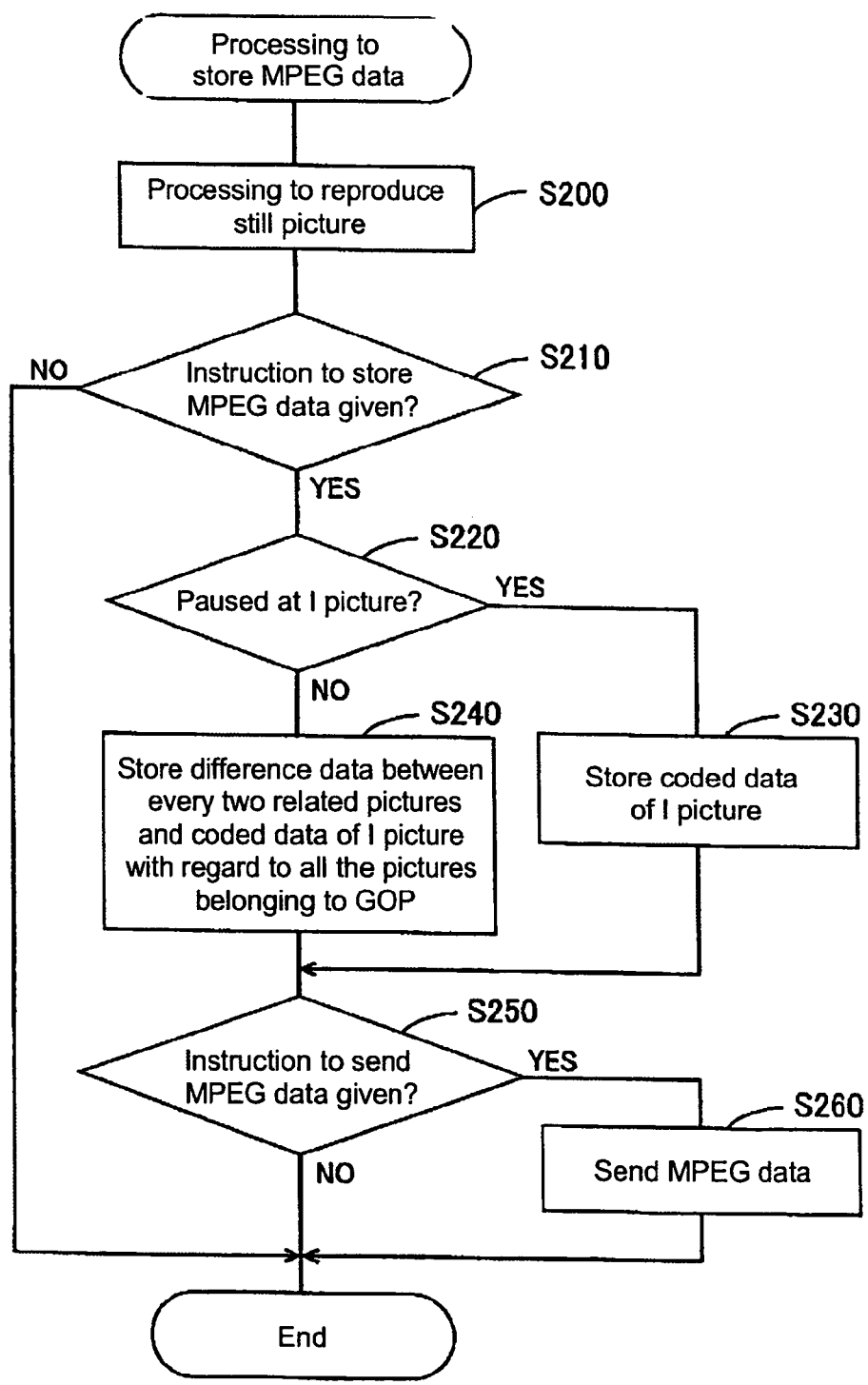
FIG. 4 is a flowchart showing another processing to store MPEG data which is called and performed in step S150 of the flowchart shown in FIG. 2.
Figure 5:
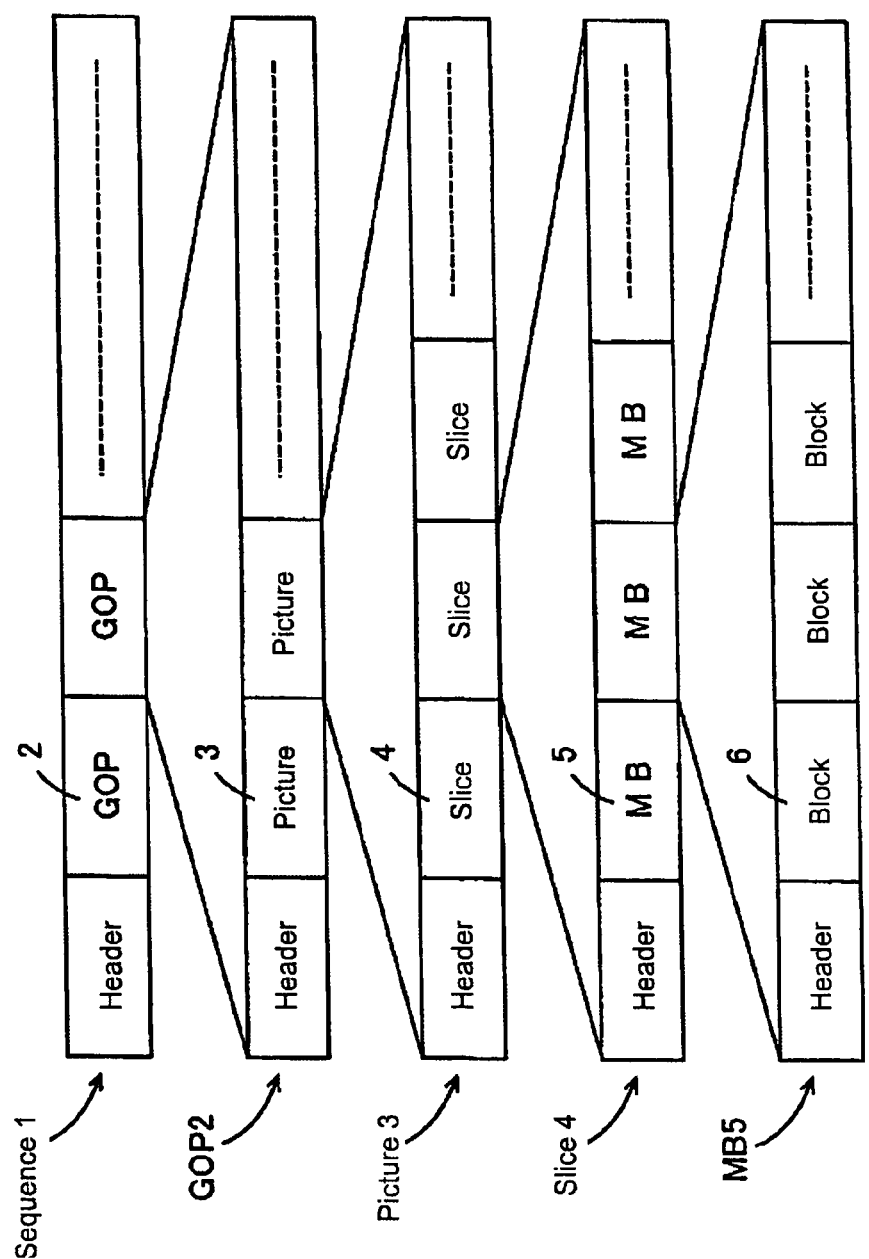
FIG. 5 is a conceptual diagram for showing a data arrangement structure of video data in MPEG.

In FIG. 3, the case is described in which, when the picture corresponding to the still picture being reproduced is a P picture or a B picture, in step S240, coded data of the I picture to be referenced by the picture and difference data between the picture and a picture to be referenced by the picture are stored in the EEPROM 28d. According to the present invention, however, as shown in FIG. 4, when the picture corresponding to the still picture being reproduced is a P picture or a B picture, with respect to all the pictures of GOP2 including such a picture, difference data between every two related pictures and coded data of the I picture included in the GOP 2 may be stored in the EEPROM 28d in step S340.

As has been described, according to the present invention, it is possible to provide a video reproducing apparatus capable of obtaining a high-quality still picture which is not degraded compared with the original compressed video data.

What is claimed is:

1. A video reproducing apparatus capable of outputting video signals based on video data constituted by a sequence of video information blocks each of which constitutes one unit by a prescribed number of intra-coded pictures each of which is video information for intra-frame coding, a prescribed number of forward predictive-coded pictures for forward prediction coding, and a prescribed number of bidirectionally predictive-coded pictures for bidirectional prediction coding, said video reproducing apparatus comprising:

a still picture reproducing processor reproducing one of the pictures as a still picture by motion compensation prediction when the reproduction of video signals is paused in a prescribed manner;

a determining processor determining whether or not the picture being reproduced as a still picture by said still picture reproducing processor is said intra-coded picture;

a saving processor saving coded data of the I picture when said determining processor determines that the picture being reproduced as a still picture by said still picture reproducing processor is said intra-coded picture, and saving difference data between the I picture and all the pictures referenced by the picture as well as coded data of the intra-coded picture referenced by the picture when said determining processor determines that the picture being reproduced as a still picture by said still picture reproducing processor is not said intra-coded picture; and a sending processor sending the coded data saved by said saving processor or the coded data and the difference data saved by said saving processor to an external memory.

2. A video reproducing apparatus capable of outputting video signals based on video data constituted by a sequence of video information locks each of which constitutes one unit by a prescribed number of intra-coded pictures each of which is video information for intra-frame coding and a prescribed number of predictive-coded pictures for prediction coding by motion compensation prediction, said video reproducing apparatus comprising:

a still picture reproducing processor reproducing one of the pictures as a still picture by motion compensation prediction when the reproduction of video signals is paused in a prescribed manner;

a determining processor determining whether or not the picture being reproduced as a still picture by said still picture reproducing processor is said intra-coded picture; and a storing processor storing coded data of the I picture when said determining processor determines that the picture being reproduced as a still picture by said still picture reproducing processor is said intra-coded picture, and storing difference data between the I picture and all the pictures referenced by the picture as well as coded data of the intra-coded picture referenced by the picture when said determining processor determines that the picture being reproduced as a still picture by said still picture reproducing processor is not said intra-coded picture.

3. A video reproducing apparatus as set forth in claim 2, comprising a sending processor sending the coded data saved by said saving processor or the coded data and the difference data saved by said saving processor to an external memory.

4. A video reproducing apparatus as set forth in claim 2, wherein said predictive-coded picture is a forward predictive-coded picture which is video information for forward prediction coding or a bidirectionally predictive-coded picture which is video information for bidirectional prediction coding.

5. A video reproducing apparatus as set forth in claim 2, wherein said video reproducing apparatus is a TV tuner.

6. A video reproducing apparatus as set forth in claim 2, wherein said video reproducing apparatus is a DVD player.

7. The video reproducing apparatus as set forth in claim 2, wherein it is checked whether or not the reproduction is paused at an I picture when it is determined that an instruction to store MPEG data has been given;

wherein coded data of the I picture corresponding to a still picture being reproduced is retrieved from a DRAM and stored in an EEPROM when it is determined that the reproduction has been paused at the I picture;

wherein coded data of the I picture to be referenced by a P picture or a B picture corresponding to the still picture being reproduced and difference data between the picture being reproduced and the I picture or the B picture to be referenced are retrieved from the DRAM and stored in the EEPROM when it is determined that the reproduction has not been paused at the I picture;

wherein it is checked whether or not an instruction to send the MPEG data is given;

wherein the MPEG data stored in the EEPROM is sent to a USB memory when it is determined that the instruction to send the MPEG data has been given; and wherein the processing to store the MPEG data is ended when it is determined that the instruction to send the MPEG data has not been given.

8. A video reproducing apparatus capable of outputting video signals based on video data constituted by a sequence of video information blocks each of which constitutes one unit by a prescribed number of intra-coded pictures each of which is video information for intra-frame coding and a prescribed number of predictive coded pictures for prediction coding by motion compensation prediction, said video reproducing apparatus comprising:

a still picture reproducing processor reproducing one of the pictures as a still picture by motion compensation prediction when the reproduction of video signals is paused in a prescribed manner;

a determining processor determining whether or not the picture being reproduced as a still picture by said still picture reproducing processor is said intra-coded picture; and a storing processor storing coded data of the I picture when said determining processor determines that the picture being reproduced as a still picture by said still picture reproducing processor is said intra-coded picture, and storing, with respect to all the pictures including the above picture belonging to said video information block, difference data between every two related I pictures and coded data of the intra-coded picture when said determining processor determines that the picture being reproduced as a still picture by said still picture reproducing processor is not said intra-coded picture.

9. A video reproducing apparatus as set forth in claim 8, comprising a sending processor sending the coded data saved by said saving processor or the coded data and the difference data saved by said saving processor to an external memory.

10. A video reproducing apparatus as set forth in claim 8, wherein said predictive-coded picture is a forward predictive-coded picture which is video information for forward prediction coding or a bidirectionally predictive-coded picture which is video information for bidirectional prediction coding.

11. The video reproducing apparatus as set forth in claim 8, wherein it is checked whether or not the reproduction is paused at an I picture when it is determined that an instruction to store MPEG data has been given;

wherein coded data of the I picture corresponding to a still picture being reproduced is retrieved from a DRAM and stored in an EEPROM when it is determined that the reproduction has been paused at the I picture;

wherein coded data of the I picture to be referenced by a P picture or a B picture corresponding to the still picture being reproduced and difference data between the picture being reproduced and the I picture or the P picture to be referenced are retrieved from the DRAM and stored in the EEPROM when it is determined that the reproduction has not been paused at the I picture;

wherein it is checked whether or not an instruction to send the MPEG data is given;

wherein the MPEG data stored in the EEPROM is sent to a USB memory when it is determined that the instruction to send the MPEG data has been given; and wherein the processing to store the MPEG data is ended when it is determined that the instruction to send the MPEG data has not been given.

* * * * *